United States Patent [19]

Peery

[11] Patent Number: 4,667,554

[45] Date of Patent: May 26, 1987

[54] ROTARY PAPER CUTTER CONSTRUCTION

[76] Inventor: Walter E. Peery, 7-74 Pendleton La., Londonderry, N.H. 03053

[21] Appl. No.: 834,417

[22] Filed: Feb. 28, 1986

[51] Int. Cl.$^4$ .............................................. B23D 15/10

[52] U.S. Cl. .......................................... 83/583; 83/611

[58] Field of Search .......................... 83/583, 610–612, 83/648, 649

[56] References Cited

U.S. PATENT DOCUMENTS 1,005,879 10/1911 Ries .................................. 83/583 X

*Primary Examiner*—James M. Meister

[57] ABSTRACT

A construction for a paper or film cutter for use with strip printers or photo copiers working from continuous rolls of paper or film. It consists of a rotary blade and a stationary blade mounted in a sheet metal U-frame. The rotary blade is driven by a rotary solenoid which provides the inboard bearing for the rotary blade and which is resiliently mounted to the frame to allow for the alignment of the outboard bearing of the rotary blade. The stationary blade is loosely mounted in slots in the U frame. The slots are dimensioned and located to position the cutting edge of the stationary blade to be askew of and to intersect the cutting edge of the rotary blade to provide a cutting point of contact between the two blades. The cutting point of contact traverses the length of the two blades during the cutting stroke. The stationary blade is held in position and the two cutting edges held in contact by the force of a single wire-formed spring applied approximately midway of the length and width of the stationary blade.

8 Claims, 3 Drawing Figures

ROTARY PAPER CUTTER CONSTRUCTION

This invention is in the field of paper and film cutters of the kind that are used in machines such as photo copiers and computer driven printers and in those machines which operate from a continuous roll of paper or film rather than from cut sheets. Further, it is in the class of cutters in which a sharp rotating blade edge operates against a sharp stationary blade edge to produce a shearing action to cut the paper web.

Further yet, it is in the class of cutters in which the planes of the two cutting blades are crossed at a slight angle and are under resilient pressure to produce a point contact between the two sharp cutting edges and in which this point of contact is the shearing point and moves from one end of the cutting edges to the other with the cutting stroke. The shearing action is the same as that produced by a pair of scissors.

The class of cutters concerned with here is in contradistinction to another class in which the cut is produced by crushing the material between two blades. In the latter class of cutter the cutting surfaces of the blades are relatively blunt, are rigidly held in position and move across each other with a very minute clearance or interference between them. The material caught between them is crushed by the blade action. The rotary sheeters used by the printing industry are examples of this latter type of cutter.

Explanation should be made here of the matter of the point contact between two sharp cutting edges to produce a shearing action. This is very old in the art and goes back hundreds of years in the art of making scissors. If a pair of scissors is examined with the blades closed, it will be observed that the outer ends of the sharp edges of the blades are in point contact and that there is space separating the length of the blades from the outer point of contact to the pivot at the handles. When the blades are opened and then slowly closed, it will be observed that this point of contact between the sharpened edges is caused by the two blades being crossed at a slight angle. It starts from the pivot and advances out to the blade ends as the blades are closed. This point of contact produces the moving cutting edge of the scissors. It will also be observed that the two blades are held in point contact by the tightness of the pivot and the springiness of the blades since most scissors blades are ground to be slightly inward curvng with respect to each other.

It can also be shown that the action of the human hand on the scissors blade handles operates to force the two blades together. This action can be demonstrated by trying to cut material with scissors having a loose pivot and by using the left hand. For this reason left handed scissors are made for left handed persons. Thus, scissors of the common variety produce a progressively moving point contact between two cutting edges in which the two edges are held in contact by a combination of resilient forces.

Wilder, in 1848 (U.S. Pat. No. 5672), invented a method of applying the resiliently maintained moving point contact to a rotary paper cutter in which one blade is stationary and the other rotates in a continuous rotary motion. His rotary blade engages the fixed blade under spring force and the two blades are skewed with respect to each other to produce the moving contact point as the rotary blade moves through its engagement with the stationary blade.

Because of this prior art, broad coverage of crossed and spring loaded blades, either pivoted or rotary, is preempted and invention can exist only in new constructions of blades and their supports and methods of applying the spring pressure between them to produce the progressive point contact shearing action. This patent specification discloses such a new construction.

It is one objective of this invention to provide a cutter construction of the moving point contact kind which minimizes assembly effort and parts and and especially precision machined parts to produce a cutter of low manufacturing cost.

It is another objective of this invention to provide such a cutter that is of compact construction.

These objectives are realized by constructing the frame and other members of blanked and formed sheet metal rather than by machined parts; by supporting the stationary blade in slots in the frame which allows easy and rapid assembly; by holding the stationary blade in place and providing the blade contact force with a single simple spring while at the same time providing a relatively uniform force between the cutting edges throughout the cutting stroke; by providing means in the frame for the support and retention of the single spring which allows easy and rapid assembly; by utilizing the bearing of the rotary driving device for one of the bearings of the rotating member and by flexibly supporting the driving device on the frame.

Particularly, the design and construction of the cutter has been made to utilize sheet metal parts to the greatest extent possible. These parts are designed so that normal sheet metal fabricating tolerances are acceptable in its sheet metal parts. Sheet metal is the preferred material because with modern methods of sheet metal working such as computer controlled laser cutting equipment the frame and other parts can be quickly, easily and inexpensively altered to suit individual user's needs. The cutter can be made to become an integral part of a total machine with attachment tabs, supports, and so forth being integral parts of the cutter frame. The one machined part, the rotary blade, is also designed to be fabricated by low cost methods. The construction is, then, an innovative improvement over cutters which are constructed mainly of machined parts, require precision fitting and occupy more space.

The illustration and description show a cutter operated by a rotary solenoid. However, the basic construction can be adapted to other kinds of drives for the rotary blade. For example, the rotary blade can be driven by a motor, a one revolution clutch mechanism or from any external mechanical motion source. Furthermore, the motion of the rotary blade can be a complete rotation in one direction rather than the forward then reverse motion that is described.

In the accompanying drawings.

The principal parts of the cutter are the rotary blade, 1, the stationary blade, 13, the driving solenoid, 6, and the frame, 4. In the description, when reference is made to the "outer end", it will mean the end near the bearing, 3. When reference is made to the "inner end", it will mean the end near the solenoid.

The paper, or other material to be cut, 25, is passed between the rotary and stationary blades, 1 and 13 respectively, prior to the cutting cycle.

The frame, 4, in its preferred embodiment, is U-shaped and is of a single piece of blanked and formed sheet metal.

The rotary blade, 1, consists of a round bar of suitable material into which a cutting edge, 2, is formed by a tapered notch running almost the full length of the bar and leaving round shaft ends, 20 and 21, at either end of the bar. The notch in the bar is shallow at the inner shaft end, 21, and deeper at the outer shaft end, 20. This taper produces a helical cutting edge along the surface of the bar and provides for a progressive contact between and along the two cutting edges as the rotary blade rotates.

The outer shaft end, 20, of the rotary blade is supported by and is free to rotate in a bearing, 3, in the cutter frame, 4. This is the first shaft bearing of the rotary blade. The inner shaft end, 21, of the cutter blade is rigidly and coaxially attached to and is an extension of the shaft, 5, of a rotary solenoid, 6, which provides the driving motion of the rotary blade. The shaft bearing of the rotary solenoid provides the second shaft bearing for the rotary blade as will be described in more detail later.

The stationary blade, 13, with its cutting edge, 18, is positioned in the frame, 4, by two blade extensions, 14 and 15, which loosely engage frame slots, 16 and 17. This loose engagement must allow free rotation and translation of the blade extensions in the slots as will be required by the motion of the fixed blade during a cutting stroke and as will be described later. The outer slot, 16, is shown as an open slot while the inner slot, 17, is shown as a closed slot although both may be open slots under a condition that will be explained later. This arrangement of one open and one closed slot or, alternatively, two open slots, allows the easy assembly of the stationary blade to the frame as well as giving the freedom of movement required by the blade extensions. The stationary blade configuration is easily fabricated from flat steel by laser blanking methods.

The cutting edge, 18, of the stationary blade is perfectly straight and its inner end may rest on either the inner shaft end, 21, of the rotary blade, 1, or the inner end of the helical cutting edge, 2, depending upon the cutter design, when the cutter is in its open or starting position.

Figure 3:
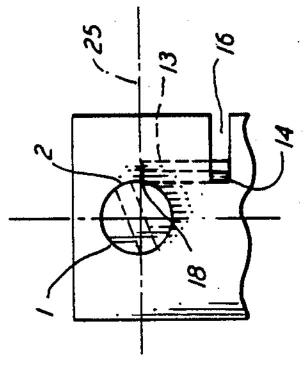
FIG. 3 is an end view of FIG. 2 and shows how the extra depth of the outer end slot produces the crossed relationship between the rotary and stationary cutter blades.

The length of the cutting edge of the stationary blade, 13, is shorter than the rotary blade cutting edge, 2, so that its outer end does not rest on the outer shaft end, 20, of the rotary cutter bar. Slot 16, which positions the outer end of the cutting edge, is deeper than slot 17 by an amount which will cause the cutting edges of the rotary and stationary blades to be slightly askew and intersect with respect to each other and thereby provide the positive point contact between the two blade edges during the cutting cycle. This is illustrated in FIG. 3. The difference in depth will be in the order of fifteen thousandths of an inch in a small cutter.

Figure 1:
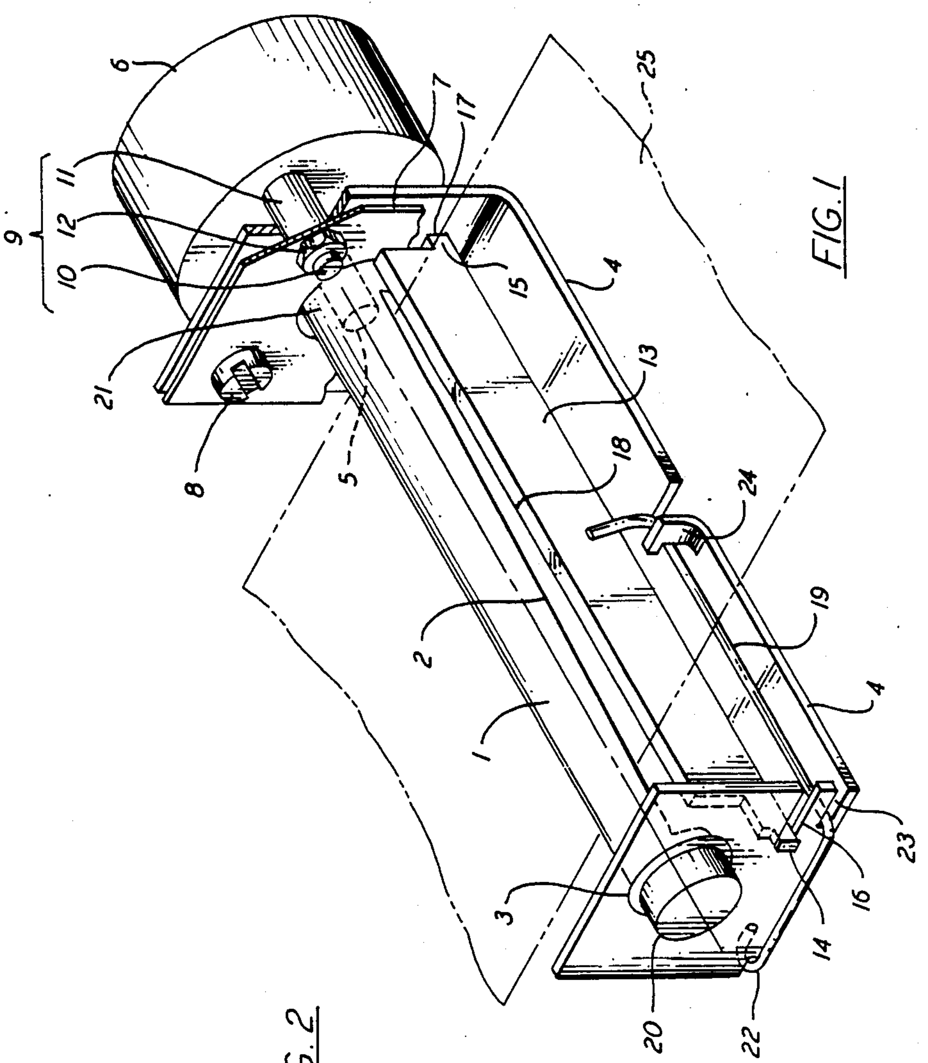
FIG. 1 illustrates one embodyment of the cutter.
Figure 2:
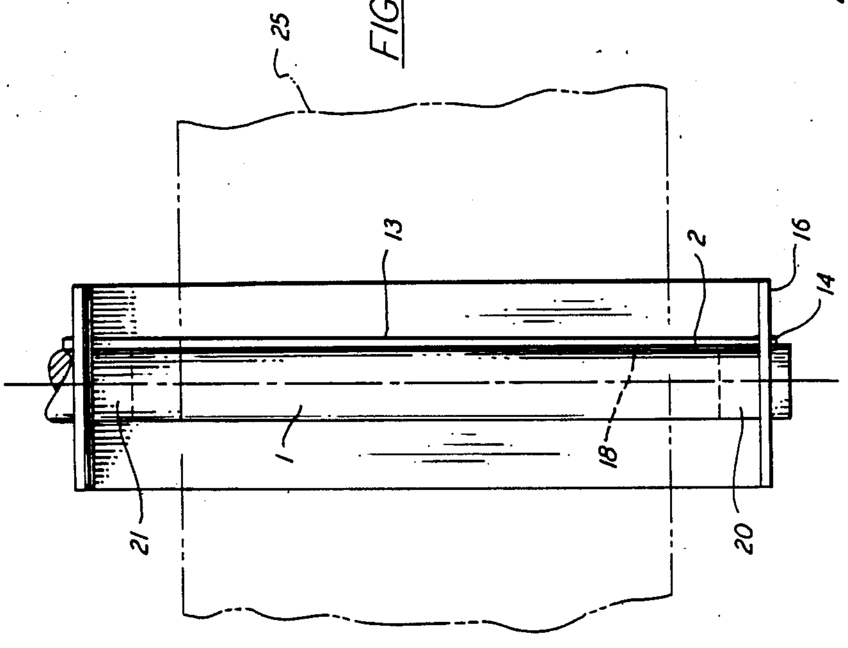
FIG. 2 is a top view of FIG. 1 showing the relationship between the rotary cutter blade and the stationary cutter blade before the beginning of a cutting cycle.

FIGS. 2 and 3 illustrate in more detail the effect of the increased depth of slot 16. FIG. 2 shows how the straight cutting edge, 18, of the stationary blade is made to intersect and be askew to the helical cutting edge, 2, of the rotary blade by the increased depth of the slot, 16. Also, it shows how the inner end of the cutting edge, 18, may rest on the inner shaft end, 21, of the rotary blade when the cutter is in the starting position.

The wire formed spring, 19 performs a double function. It holds the stationary blade in place and it provides the force holding the two cutting edges in contact. The spring is retained in place by slots, 22 and 23, and retaining tab, 24, which are integral with the frame. The spring is easily assembled to the frame by inserting it in the slots and snapping it over the tab. Thus, by two simple assembly operations the fixed blade is inserted in the frame, fastened in place and given its resilient force.

While one such spring, 19 is shown, more than one spring can be used, the resultant single force from multiple springs being located as described. Furthermore, rather than wire-formed springs, leaf springs may be used instead. The single wire-formed spring is preferred as the most economical in manufacturing and assembly cost.

As shown, the spring, 19, applies its force near the center of the stationary blade with respect to the blade's length, which is the preferred point of application.

The point at which the spring, 19, applies its force with respect to the stationary blade's length and width will have an effect on the behavior of the stationary blade during the cutting cycle. If the point of contact is at or below the diagonals of the plane of the blade, then the cutting edge, 18, of the stationary blade will pivot outward. The pivoting will take place around the blade extensions, 14 and 15. If the point of contact is above the diagonals, then the stationary blade will move in a complex manner which will be a combination of small pivoting and traversing motionsd of the blade extensions in their slots. The exact point of application of the spring force with respect to the blade width is relatively immaterial as long as there is sufficient contact pressure between the two blades to satisfactorily cut the material at hand. When the point of contact is below the diagonals, then slot 17 may be open as is slot 16.

The rotary blade is driven by the solenoid, 6 through an angle of approximately 45 degrees to produce the cutting action in the cutter illustrated. During the cut the helical cutting edge, 2 engages the stationary cutting edge, 18, in a single point of contact as has been previously described. This single point of contact begins at the inner ends of the two cutting edges at the beginning of the cutting stroke and proceeds to the outer ends of the two cutting edges at the end of the cutting stroke. At the end of the stroke the solenoid reverses direction and returns to its beginning position.

While a rotary solenoid is illustrated and is preferred, any device which will provide the required rotary motion and is suitable may be used.

The rotary solenoid, 6, in this preferred embodyment is one such as that manufactured by Ledex, Incorporated, of Vandalia, Ohio. It contains within itself a shaft bearing for its rotary shaft which is relatively long with respect to its shaft diameter. A construction has been arranged that utilizes this bearing to serve a second function, that of functioning as the inner end bearing of the rotary blade, 1. Therefore, the inner end of the rotary blade and the solenoid shaft are rigidly fastened together and the solenoid bearing serves also as the inner bearing of the rotary blade.

The inaccuracies of the solenoid construction and of the sheet metal supporting frame require that a means of aligning the solenoid and rotary blade assembly with the outer end bearing, 3, must be provided. This is necessary to avoid the possible binding of the rotary cutter blade in its bearings. The means consists of the flexible support plate, 7, which is in a plane approximately perpendicular to the axis of the round rotary blade, 1, and at the solenoid end of the rotary blade. This flexible support plate is made of a thin, flexible material such as 0.015" thick sheet steel. It is fastened to the cutter frame and spaced away from it by two screws, 8, only one of which is visible in the illustration. A thin spacing washer, not illustrated, on each screw provides the spacing between the flexible support plate and the cutter frame, 4.

Oriented away from the frame fastenings, 8, at an angle of approximately ninety degrees, are the solenoid mountings, 9, attached to the flexible plate, 7. Only one of the two solenoid mountings is visible in the drawing. The rotary solenoid, 6, comes equipped with two threaded studs, 10. By means of these studs, and with spacers, 11, and nuts, 12, the solenoid is mounted to the flexible plate, 7. The spacers, 11, pass through clearance holes in the frame end while the inner shaft end of the rotary blade passes through clearance holes in the flexible plate and the frame end. With this construction, and with a slight flexing of the flexible plate, the outer end of the rotary blade can be moved in any direction with respect to the cutter frame. This allows its outer end to engage the bearing, 3, with a slight flexing of the flexible plate, 7, as may be required by the inaccuracies of the frame and other parts.

The innovative construction by which the rotary solenoid's shaft is rigidly connected to the rotary blade, 1, and the rotary solenoid in turn fastened to the cutter frame serves additional purposes. The solenoid's shaft is constrained from axial movement except for a functional movement of a few thousandths of an inch. The rotary blade, 1, is then held in position axially in the frame without the expense of providing stepped shafts, retaining rings or other devices on the rotary blade for this purpose. A further purpose of this construction is that it results in a very compact cutter which may be more readily fitted into cramped spaces than cutters having external driving mechanisms.

With the inventive construction above described, the objectives of the invention have been achieved. Other embodiments will be within the scope of the following claims.

What is claimed is:

1. A cutter comprising:

a frame;

a rotatable member supported by said frame and carrying a helical cutting edge;

a substantially rectangular stationary member having a length and a width and supported by said frame;

a second cutting edge supported by said stationary member, said second edge being substantially straight; wherein:

said frame incorporates slots for the support of said stationary member;

said stationary member has extensions of its length and said extensions engage loosely in said slots in said frame for its support;

said extensions are free to move rotationally and translationally in said slots;

said slots supporting said stationary member are so located as to cause said straight cutting edge supported by said stationary member to be slightly askew to said helical cutting edge and to intersect and make point contact with said helical cutting edge;

resilient force applied to said stationary member provides resilient contact force between said helical and straight cutting edges;

rotary motion is applied to said rotary member to rotate said helical cutting edge against said straight cutting edge to produce a progressive shearing point of contact between and along said helical and straight cutting edges.

2. A cutter according to claim 1 wherein said applied rotary motion additionally produces a concurrent rotational and translational motion of said extensions of of said stationary member in said slots in said frame.

3. A cutter according to claim 1 wherein the said resilient force additionally retains said extensions of said stationary member in said slots.

4. A cutter according to claim 1 in which the resilient force applied to the stationary member is supplied by at least one mechanical spring.

5. A cutter according to claim 1 in which the resilient force applied to the stationary member is supplied by at least one wire-formed spring.

6. A cutter according to claim 5 wherein:

said frame incorporates additional slots and at least one retaining tab;

and said at least one wire formed spring engages and is held in place by said additional slots and said at least one retaining tab.

7. A cutter according to claim 1 in which said frame incorporating said slots is comprised of a single piece of blanked and formed sheet metal.

8. A cutter according to claim 1 wherein:

a first shaft bearing for said rotary member is in said frame;

said rotary motion is provided by a rotary device having a shaft and which contains within itself a shaft bearing;

the shaft of the rotary device is rigidly attached to the said rotatable member;

said shaft bearing of said rotary device serves as a second shaft bearing for said rotatable member;

said rotary device is mounted on a resilient plate that is attached to said frame; and the flexing of said resilient plate allows the alignment of said second shaft bearing with said first shaft bearing in said frame.

* * * * *